Figure 1:
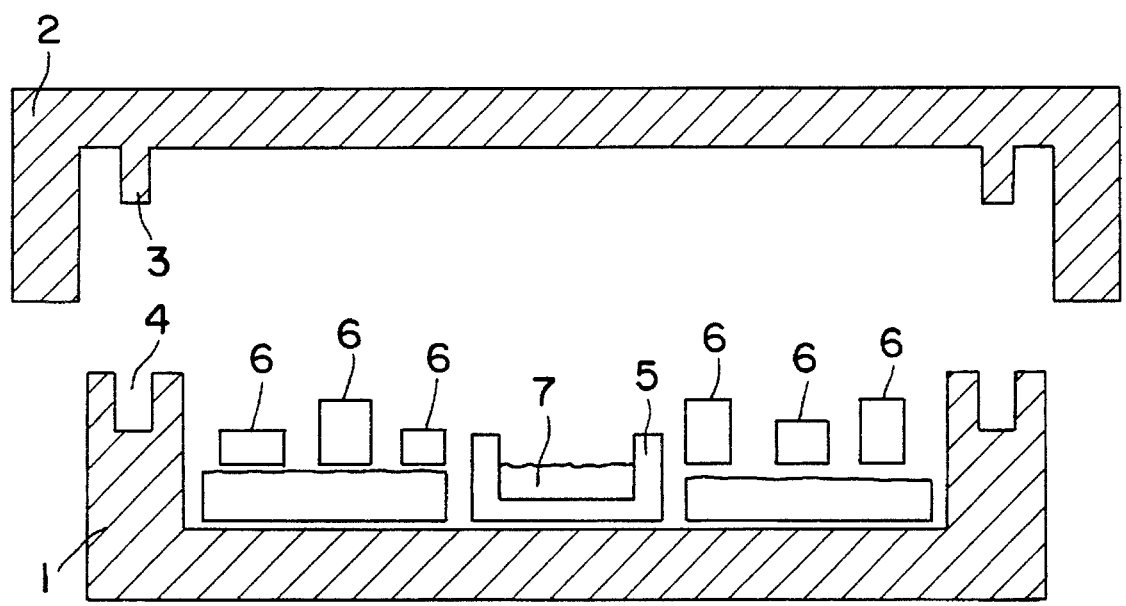

United States Patent [19]

Sterzel et al.

[11] Patent Number: 5,604,919
[45] Date of Patent: Feb. 18, 1997

[54] SINTERED PARTS MADE OF OXYGEN-SENSITIVE NON-REDUCIBLE POWDERS AND THEIR PRODUCTION BY INJECTION-MOLDING

[75] Inventors: Hans-Josef Sterzel, Dannstadt-Schauernheim; Hans Wohlfromm, Ludwigshafen, both of Germany

[73] Assignee: BASF Aktiengesellschaft, Ludwigshafen, Germany

[21] Appl. No.: 684,477

[22] Filed: Jul. 29, 1996

Related U.S. Application Data

[63] Continuation of Ser. No. 397,951, Mar. 3, 1995, abandoned.

[30] Foreign Application Priority Data

Mar. 11, 1994 [DE] Germany ............................ 44 08 304.1

[51] Int. Cl.$^6$ ........................................................ B22F 3/16
[52] U.S. Cl. ................. 419/30; 419/33; 419/36; 419/38; 419/41; 419/53; 419/54
[58] Field of Search ............................. 419/30, 33, 36, 419/38, 44, 53, 54

[56] References Cited

U.S. PATENT DOCUMENTS

| | | | |
|---|---|---|---|
| 3,708,285 | 1/1978 | Scheyer et al. | 75/221 |
| 4,778,515 | 10/1988 | Kemp, Jr. et al. | 75/0.5 BA |
| 4,917,859 | 4/1990 | Hamo | 419/36 |
| 5,439,964 | 8/1995 | Ohst et al. | 524/297 |

FOREIGN PATENT DOCUMENTS 329745  8/1989  European Pat. Off. .
524438  1/1993  European Pat. Off. .

OTHER PUBLICATIONS

Randell M. German "Powder Metallurgy Science" Metal Powder Industries Federation (1984) Princeton, New Jersey pp. 189–194.

Primary Examiner—Charles T. Jordan
Assistant Examiner—Daniel Jenkins
Attorney, Agent, or Firm—Keil & Weinkauf

[57] ABSTRACT

The preferred sintered parts made of oxygen-sensitive, non-reducible powders and their production by injection-molding are distinguished by the powders used being freed of their oxide layer by attritor milling in a water-free organic solvent, in the presence or absence of an additional reductant, the oxide particles being removed if necessary by filtration or screening in the presence of the organic solvent, the oxide-free powder being mixed as suspension with a polyacetal as binder under a protective gas, the organic solvent being distilled off, the mixture of powder and polyacetal being heated above the melting point of the polyacetal and being compounded to give a homogeneous composition, the granular material thus obtained being processed in an injection-molding machine made inert with argon to give shaped bodies, the shaped bodies being freed of binder under the action of oxalic acid in a closed ceramic container which nevertheless allows pressure equilibration under protective gas at atmospheric pressure or reduced pressure, the shaped bodies being, after binder removal, transferred in their container without contact with air into a sintering furnace and being sintered therein according to the prior art.

10 Claims, 1 Drawing Sheet

SINTERED PARTS MADE OF OXYGEN-SENSITIVE NON-REDUCIBLE POWDERS AND THEIR PRODUCTION BY INJECTION-MOLDING

This application is a continuation of application Ser. No. 08/397,951, filed on Mar. 3, 1995, now abandoned.

The powder injection-molding process is used for producing complex metallic and ceramic shaped parts. Sinterable metal or ceramic powders are mixed with an organic binder, so that the proportion by volume of sinterable powder is from 40 to 70% and the composition is able to flow at elevated temperatures. The compound is melted in the plasticizing part of an injection-molding machine and the melt is injected into the tool. There the melt solidifies and after from 10 to 200 seconds the parts (green part) is taken from the mold. The binder, which is only required for the shaping process and interferes later, is removed from this green part while maintaining the correct dimensions.

Various methods can be used for this purpose, namely pyrolysis, a combination of extraction with a solvent and subsequent pyrolysis, extraction with supercritical carbon dioxide or depolymerization of the binder by means of acid gases if a polyacetal has been used as binder.

The result of the binder removal process is always a more or less fragile part which has about the same proportion by volume of pores as was taken up by the binder before binder removal.

The part shrinks only during subsequent sintering, with from 92 to 100% of the theoretical density being obtained, depending on the material.

Injection-molding technology can be used to produce parts based on ceramic powders such as $Al_2O_3$, $ZrO_2$, $Si_3N_4$, SiC. However, metal parts based on iron, nickel and cobalt containing alloying elements such as chromium, molybdenum, copper, vanadium, niobium or tungsten can also be produced in this way.

Although most of these metal powders are sensitive to oxidation and are therefore coated with an oxide layer, they are predominantly sintered in a hydrogen-containing, reducing atmosphere. The oxide layer is thereby reduced to metal before actual sintering occurs. This prevents the oxide layer from inhibiting or completely preventing the sintering process.

However, the removal of the oxide layer is not successful if the powders to be sintered are element or alloy powders which cannot be reduced by hydrogen to form reduced parts having water contents which correspond to dew points of greater than −70° C. Such elements are magnesium, aluminum, silicon, titanium, zirconium or rare earth metals. Among these, great industrial importance attaches to the metals titanium and silicon as alloy constituents of iron and also rare earth metals as alloy constituents of high-coercivity magnets based on samarium and cobalt or based on iron, neodymium and boron, preferably $SmCo_5$, $Sm_2Co_{17}$ or $Nd_2Fe_{14}B$. These magnet materials can also contain other elements in smaller proportions of less than 10 percent by mass of the total mass.

For the sintering of Fe/Si alloys or titanium powder, a solution which has been proposed is to carry out the reduction using carbon which originates from the binder (EP 0 356 131 B1). However, this procedure has the disadvantage that the carbon content originating from pyrolysis of the binder has to correspond exactly to the amount of oxide to be reduced. Finally, excess carbon has a strong embrittling effect, even in amounts of a few tenths of one percent. In addition, the carbon content from the binder is dependent not only on the original binder content but also on a series of further parameters such as composition and particle size of the powder to be sintered, the wall thickness of the parts, the proportion by volume of the powder and the heating rate during binder pyrolysis. These many effects make the reduction of the oxide layer by carbon impractical.

If the carbon is introduced as elemental carbon such as carbon black or graphite powder, it can easily lead to incomplete oxide reduction and to embrittlement as a result of local excess concentrations.

Finally, the reduction of the oxides with carbon is not successful for the elements of the third main and transition groups nor for elements of the second main group of the Periodic Table.

For this reason, it has previously been proposed to carry out both binder removal and sintering completely with exclusion of air. Thus, the Japanese Patent 64-28 302 describes the production of rare earth magnets using a paraffin wax binder which softens at below 120° C. The binder removal from the green parts is carried out under reduced pressure at pressures of less than 20 torr or under argon using a heating rate of 2°–10° C./min. Both binder removal and sintering are carried out in the same furnace, so that the binder-free, highly porous and thus also highly reactive green part does not have to be exposed to the air. The Japanese Patent 64-28 303 likewise describes binder removal and sintering or rare earth magnets in the same furnace, with binder removal being carried out at a reduced pressure of $10^{-1}$ torr and a heating rate of 2°–10° C./min. The binder there is a mixture of polystyrene, paraffin wax and calcium stearate in a ratio of 2:2:1.

However, this procedure causes severe technical difficulties, because binder removal and sintering have to be carried out in the same furnace. As regards both performance and instrumentation, sintering furnaces are designed for high temperatures of about 1200° C. or more. The careful temperature control in the range from room temperature to 300° C. required for binder removal is difficult to carry out in such furnaces. In addition, the pyrolysis products deposit on the cooled wall and in the vacuum pipes and can thus lead to malfunctions in further operation.

It is the object of the present invention to produce, in a practical manner, sintered parts based on oxygen-sensitive, non-reducible powders using shaping by injection-molding.

We have found that this object is achieved by the process defined in the claims. The preferred measures comprise the use of powders free of an oxide layer or the removal of the oxide layer with exclusion of air and moisture, compounding the powders with the binder under exclusion of air and moisture, injection-molding and storage of the green parts with exclusion of air and moisture, binder removal from the parts under reducing conditions in argon or under reduced pressure in a separate binder removal furnace, use of a simple storage and transport apparatus which makes possible transport into the sintering furnace under a protective gas, and finally sintering in the separate sintering furnace.

In accordance with the invention there is provided a process for producing sintered parts in which green parts comprising sinterable material and binder are converted into raw parts by binder removal and the raw parts are sintered in the absence of oxygen, which comprises, after removal of the binder from the green part, transferring the raw part in a container which withstands sintering temperatures and is designed and operated in such a way that the raw part is protected from exposure to harmful materials, in particular oxygen, into a sintering furnace and sintering the raw part in the container in the sintering furnace.

Preferred embodiments of the invention include one or more of the following features:

1. A green part, which contains as material to be sintered a sinterable material selected from the group consisting of Mg, Si, Ti, Al, Zr, rare earth metals, Fe/Si alloys, preferably Ti, Si, and coercive magnetic materials, preferably Sm/Co or Fe/Nd/B/Co, and as binder a binder material selected from the group consisting of: polyacetals, paraffin waxes, polyolefins, the polyolefins preferably being ethylene and propylene polymers.

2. The binder removal from the green part is carried out in the container.

3. The binder removal is carried out using one or more of the following measures:

a) contacting the green part with a liquid medium, in particular a gas, which dissolves the structure of the binder material, in particular decomposes the binder material chemically, b) contacting the green part one or more times with flushing gas and conducting away the flushing gas together with the binder or binder constituents, c) carrying out the binder removal under reducing conditions, d) carrying out the binder removal under a protective gas, in particular a noble gas, preferably argon, or under reduced pressure.

4. The transfer of the raw part (part freed of binder) is carried out using at least one of the following operating conditions:

a) a protective gas, in particular a noble gas, preferably argon, is present in the interior of the container, b) the interior of the container is maintained at a temperature which is lower, in particular at least 5°–20° C., preferably at least 5°–10° C. lower, than that of the atmosphere surrounding the container, 5. For or during sintering one or more of the following measures are used, if desired a plurality of times in succession:

a) preheating the sintering furnace;

b) charging the sintering furnace with protective gas, in particular noble gas, preferably argon;

c) evacuating the sintering furnace containing the raw part;

d) charging the sintering furnace containing the raw part with protective gas, in particular noble gas, preferably argon.

6. The green parts are produced by molding, in particular injection molding, a product which is able to flow and contains binder and material to be sintered, with the product which is able to flow being preferably produced by compounding of pulverulent material to be sintered and binder with exclusion of oxygen and moisture.

7. The material which is able to flow is produced by heating the binder, in particular by heating a mixture of binder and material to be sintered, to a temperature at which the binder is able to flow.

8. The material to be sintered is freed of oxidized regions by mechanical abrasive treatment, in particular milling, preferably attritor milling, the oxide particles which have thus been abraded off are, if desired, separated from the material to be sintered, and the material to be sintered is then, without a further contact with oxygen or moisture, processed to give the material which is able to flow.

9. The material to be sintered is subjected to attritor milling in an organic liquid.

In accordance with the invention there is also provided a ceramic container for sintered parts comprising an accommodation part of ceramic, which is designed for accommodating the part to be sintered, and a closure part of ceramic which is designed and can be joined to the accommodation part in such a way that the entire part protects a sintered part located therein from exposure to oxygen from the outside, with the ceramic material being one which withstands sintering temperatures.

Preferred embodiments of the ceramic container include one or more of the following features:

1. The accommodation part and enclosure part are configured as container and lid respectively which have sufficiently accurate shaping of the surfaces coming into contact with one another to prevent oxygen passing through between container and lid.

2. The accommodation part and closure part can, by means of a joint comprising a rib-like projection and a groove-like recess, be joined in such a way that in the closed state of the ceramic container the rib-like projection engages in the groove-like recess to form a seal against entry of oxygen.

3. The ceramic container consists essentially of $Al_2O_3$.

4. One or more open-pored substrates for the material to be sintered, and/or a container for a chemical treatment agent, in particular a binder removal agent, preferably oxalic acid, are present in the ceramic container, with the open-pored substrates and any ceramic container used for the chemical treatment agent preferably consisting of the same ceramic material as the ceramic container.

The invention will now be described in detail with reference to FIG. 1 which schematically shows a ceramic container of the invention in cross section.

The powders used are largely produced by preliminary spraying of their melts in a protective gas atmosphere. The individual process variants do not need to be described in more detail here.

It is sometimes possible to obtain the powders thus produced in transport containers under protective gas, usually argon. In this case, the powders are free of oxide layers from the beginning. If the powders cannot be obtained oxide-free, their oxide layers are removed by attritor milling in a solvent which is free of water and air. Suitable solvents are essentially all hydroxyl-free solvents from hydrocarbons such as hexane, heptane, octane and petroleum ether mixtures to polar solvents such as ketones and ethers, for example acetone and methyl ethyl ketone.

The oxides removed are either left in the suspension, for example if the amount present is so low that it will not impair the future material properties, or they are removed from the pure metal powders by filtration or centrifugation utilizing the smaller particle size of the oxides.

If desired, the mixture can also have added to it small amounts of strongly electronegative metals or reductants for reducing the oxides, for example magnesium, calcium or preferably lithium which, owing to its low density, can easily be removed from the mixture, or a multicomponent reductant containing active hydride ions such as, for example, lithium boron hydride which can likewise be very easily removed owing to its low density.

Mixing with the binder is carried out under protective gas, preferably argon. Suitable mixing machines are, in particular, heated compounders which are flushed with argon. If a suspension of powder in a solvent is used, the suspension is introduced into the compounder without prior solvent removal. The binder is then added, the solvent is distilled off by heating under protective gas and compounding with the binder is then carried out. It is also possible to use solvents which are miscible with the binder, for example diethylene glycol dimethyl ether with polyacetal temperatures above 150° C. In this case, mixing is made easier by a reduced viscosity. Toward the end, the solvent is drawn of under reduced pressure. By lowering the temperature of the compounder to below the solidification temperature of the binder, the molten mixture is granulated under inert gas or reduced pressure while still in the compounder and is then transferred under inert gas into a transport container. Shaping is carried out using the injection-molding process.

The feed hopper and the plasticizing unit of the injection-molding machine are made inert by introducing argon into the feed hopper until the latter is full. The granulated powder is then introduced and entrained air is again displaced by argon. After the shaping process, the green parts are far less oxidation sensitive than the powders, because they have a far lower surface area and the surface of the green part is virtually always coated by a continuous layer of binder.

The materials are most sensitive after binder removal, when they form a highly porous shaped body. For this reason it is particularly important to complete the binder removal and the transport to the sintering furnace with exclusion of air and moisture. A binder removal process which is particularly useful for this purpose is that described in EP-A-413 231, where the binder used is a polyacetal which is rapidly depolymerized below its softening temperature under the action of an acid-containing atmosphere to give formaldehyde, a reductant.

Since the binder removal proceeds below the softening temperature of the polyacetal, any distortion is avoided. The depolymerizing acid used is oxalic acid, likewise a reductant. Its suitability for binder removal is described in DE-A-43 14 694.5.

Binder removal is carried out in a container as shown in FIG. 1; a plurality of these containers are arranged in a vacuum drying oven. The container 1 and the associated lid 2 are made of a nonporous high-temperature-resistant, ceramic material, preferably aluminum oxide. Container and lid are not joined to one another in a gastight manner, the lid lies loosely on the container. However, the interlocking tongue and groove 3, 4 of lid 2 and container 1 ensures that gas exchange between the interior space and the surroundings can only occur very slowly. In the middle of the container there is a small dish 5 made of the same dense ceramic material. The dish is charged with a few grams of oxalic acid 7. The still insensitive parts 6 which are to have the binder removed are briefly exposed to the air and sat on coarse-porosity, open-pored ceramic plates 8 to ensure that the acid-containing atmosphere can also reach the underside of the parts.

After charging the containers, these are transferred to a vacuum drying oven. By repeated evacuation and filling with argon, the air in the container and in the entire drying oven is replaced by argon. The drying oven together with contents is then heated from 110° to 140° C., whereupon binder removal proceeds. The binder removal can be carried out either under atmospheric pressure or under reduced pressure. Depending on the powder size, the parts are freed of binder at rates of 1 to 3 mm of wall thickness per hour. After binder removal is complete, the drying oven is evacuated to remove the formaldehyde formed in the containers and is filled with argon and cooled under argon at atmospheric pressure, preferably using additional water cooling. When the containers are taken from the drying oven to transfer them to the sintering furnace, particular care must be taken to ensure that they are somewhat cooler than the surroundings to prevent the protective gas in the interior space from cooling down, contracting and thus sucking in air. For the same reason, the sintering furnace is kept at a somewhat higher temperature level.

After loading and closing the sintering furnace, it is repeatedly evacuated and filled with protective gas. The sintering conditions specific to the individual materials and corresponding to the prior art are then set.

EXAMPLE 1

3 kg of titanium powder having a particle size of less than 22 µm are milled under petroleum spirit for 24 h in an attritor mill which is half full of steel balls having a diameter of about 2 mm.

The petroleum spirit has a boiling range of 80°–110° C., its density is 0.70 g/cm$^3$. The milling media are then separated from the millbase by means of a sieve having a mesh opening of about 1 mm, with the millbase always being covered with petroleum spirit. Finally, the material abraded during milling, which contains the titanium oxides, is removed by means of a filter having a pore width of 2–4 µm. For this purpose, the suspension is agitated on the filter while washing with petroleum spirit, so as to remove the abraded material containing the oxide as completely as possible from the millbase. The major part of the petroleum spirit is decanted off the purified millbase; it can be reused. The Ti suspension, which is completely covered with petroleum spirit, is transferred to a heatable, gastight and liquid-tight compounder. The mass % of metal powder used here is calculated according to $$m_M = (mtot - \rho S \times Vtot)/\left(1 - \frac{\rho S}{\rho M}\right).$$

mtot=total mass of the suspension (metal powder+solvent)
Vtot=total volume of the suspension
$\rho S$=density of the solvent
$\rho M$—density of the metal powder According to this, 2.8 kg of essentially oxide-free titanium powder were used. Into the suspension present in the compounder were metered 324 g of a polyoxymethylene containing about 2.5 mol % of butanediol formal as comonomer and having a melt flow index according to DIN 53735 of 50 g/10 min at 190° C. and under a load of 2.16 kg. Additionally metered in were 17 g of a polyethylene having a density of 0.918 g/cm$^3$ and a melt flow index of 30 g/10 min at 190° C.

The compounder was heated in a stream of argon and the petroleum spirit distilled off at temperatures around 100° C. The composition was then heated to 170°–180° C. and, after the polyacetal had been melted, was compounded for about 1 hour at 170°–180° C. The mixture was then cooled with slow compounding, granulating the composition. The contents of the compounder, the finished injection-molding composition, was discharged into an argon-filled container. The titanium powder content was 57% by volume. The injection-molding composition was subsequently processed in an injection-molding machine made inert with argon to give tensile bars having a shaft diameter of 5.65 min. For this purpose, the composition was melted at 180° C. and injected into a mold at 135° C. A number of the green parts thus obtained were placed in an aluminum oxide container having an internal diameter of 12 cm and a height including lid of 30 mm, in accordance with the description. In the container, a small aluminum oxide dish was charged with 4 g of oxalic acid. The container was placed in a vacuum drying oven.

The vacuum drying oven was twice in succession evacuated to about 1 mbar and then filled with argon. The drying oven was then heated to 135° C. and left at this temperature for 3 hours while the drying oven was flushed with an argon stream of about 50 l/h. The drying oven was then twice evacuated to about 1 mbar and filled with argon. The heating was switched off and the drying oven was allowed to cool to 30° C. with argon flushing. The container with the samples was taken out at about 35°–40° C. under a curtain of warm air and placed in the sintering furnace which had been preheated to 50°–60° C. The sintering furnace was closed and twice evacuated to about $10^{-4}$ mbar and filled with argon. The furnace was then evacuated to $10^{-4}$ mbar and heated to 1320° C. at a heating rate of 10° C./min, held at 1320° C. for 3 h and then cooled. This gave titanium parts which contained less than 0.05% of carbon and less than 0.1% of oxygen. Their density was 4.37 g/cm$^3$, i.e. 97% of the theoretical density (4.505 g/cm$^3$).

EXAMPLE 2

An alloy powder having the composition 66% Fe, 28% Nd, 5% Co, 1% B and a particle size of about 10 μm, which is suitable for the production of rare earth magnets, was freed of oxide by milling in petroleum spirit using the method of example 1 and, as described there, processed to give an injection-molding composition containing 56% by volume of metal powder. The composition was, as described, processed by injection-molding to give green parts, the green parts were freed of binder and, after binder removal, the parts were transferred into a sintering furnace. The sintering furnace was twice evacuated to about $10^{-4}$ mbar and filled with argon. The furnace was then evacuated to $5\times10^{-5}$ mbar and heated to 1190° C. at 10° C./min. After 1 h at 1190° C., the furnace was cooled in a controlled manner to 850° C. at 2° C./min; further cooling was more rapid and not controlled. The sintered parts contained less than 0.05% of carbon and less than 0.1% of oxygen.

We claim:

1. In the process for producing sintered parts in which green parts comprising sinterable material and binder are converted into raw parts by binder removal, and the raw parts are sintered in the absence of oxygen, the improvement which comprises removing the binder from the green part in a separate binder removal furnace to prepare the raw part, transferring the raw part in a container which withstands sintering temperatures and is designed and operated in such a way that the raw part is protected from exposure to harmful materials, in particular oxygen, into a separate sintering furnace and sintering the raw part in the container in the separate sintering furnace.

2. A process as claimed in claim 1, wherein the green part is one which:

(a) contains as material to be sintered a sinterable material selected from the group consisting of Mg, Si, Ti, Al, Zr, rare earth metals, Fe/Si alloys, preferably Ti, Si, and coercive magnetic materials, preferably Sm/Co or Fe/Nd/B/Co, (b) contains as binder a binder material selected from the group consisting of: polyacetals, paraffin waxes, polyolefins, the polyolefins preferably being ethylene and propylene polymers.

3. A process as claimed in claim 1, wherein the binder removal from the green part is carried out in the container.

4. A process as claimed in claim 1, wherein the binder removal is carried out using one or more of the following measures:

(a) contacting the green part with a liquid medium, in particular a gas, which dissolves the structure of the binder material, in particular decomposes the binder material chemically, (b) contacting the green part one or more times with flushing gas and conducting away the flushing gas together with the binder or binder constituents, (c) carrying out the binder removal under reducing conditions, (d) carrying out the binder removal under a protective gas, in particular a noble gas, preferably argon, or under reduced pressure.

5. A process as claimed in claim 1, wherein the transfer of the raw part (part freed of binder) is carried out using at least one of the following operating conditions:

(a) a protective gas, in particular a noble gas, preferably argon, is present in the interior of the container, (b) the interior of the container is maintained at a temperature which is at least 5°–20° C. lower than that of the atmosphere surrounding the container.

6. A process as claimed in claim 1, wherein for or during sintering one or more of the following measures are used, if desired a plurality of is times in succession:

(a) preheating the sintering furnace;

(b) charging the sintering furnace with protective gas, in particular noble gas, preferably argon;

(c) evacuating the sintering furnace containing the raw part;

(d) charging the sintering furnace containing the raw part with protective gas, in particular noble gas, preferably argon.

7. A process as claimed in claim 1, wherein the green parts are produced by molding, in particular injection-molding, a product which is able to flow and contains binder and material to be sintered, with the product which is able to flow being preferably produced by compounding of pulverulent material to be sintered and binder with exclusion of oxygen and moisture.

8. A process as claimed in claim 7, wherein the material which is able to flow is produced by heating the binder, in particular by heating a mixture of binder and material to be sintered, to a temperature at which the binder is able to flow.

9. A process as claimed in claim 7, wherein the material to be sintered is freed of oxidized regions by mechanical abrasive treatment, in particular milling, preferably attritor milling, the oxide particles which have thus been abraded off are, if desired, separated from the material to be sintered, and the material to be sintered is then, without a further contact with oxygen or moisture, processed to give the material which is able to flow.

10. A process as claimed in claim 9, wherein the material to be sintered is subjected to attritor milling in an organic liquid.

* * * * *